(12) United States Patent
Tang et al.

(10) Patent No.: US 12,699,886 B2
(45) Date of Patent: Aug. 4, 2026

(54) METHOD FOR NEURAL NETWORK WITH WEIGHT QUANTIZATION

(71) Applicants: TAIWAN SEMICONDUCTOR MANUFACTURING COMPANY, LTD., Hsinchu (TW); NATIONAL TSING HUA UNIVERSITY, Hsinchu City (TW)

(72) Inventors: Kea Tiong Tang, Taipei City (TW); YuHsiang Cheng, Kaohsiung City (TW)

(73) Assignees: TAIWAN SEMICONDUCTOR MANUFACTURING COMPANY, LTD., Hsinchu (TW); NATIONAL TSING HUA UNIVERSITY, Hsinchu City (TW)

( * ) Notice: Subject to any disclaimer, the term of this patent is extended or adjusted under 35 U.S.C. 154(b) by 1120 days.

(21) Appl. No.: 17/719,294

(22) Filed: Apr. 12, 2022

(65) Prior Publication Data

US 2023/0325642 A1     Oct. 12, 2023

(51) Int. Cl.
*G06N 3/049*          (2023.01)
*G06N 3/045*          (2023.01)
*G06N 3/048*          (2023.01)
*G06N 3/08*           (2023.01)

(52) U.S. Cl.
CPC ............. *G06N 3/049* (2013.01); *G06N 3/045* (2023.01); *G06N 3/048* (2023.01); *G06N 3/08* (2013.01)

(58) Field of Classification Search
CPC ........ G06N 3/049; G06N 3/048; G06N 3/045; G06N 3/08
See application file for complete search history.

(56) References Cited

U.S. PATENT DOCUMENTS

2019/0347550 A1* 11/2019 Jung ........................ B25J 9/161

OTHER PUBLICATIONS

M. B. G. Sulaiman, K.-C. Juang and C.-C. Lu, "Weight Quantization in Spiking Neural Network for Hardware Implementation," 2020 IEEE International Conference on Consumer Electronics—Taiwan (ICCE—Taiwan), Taoyuan, Taiwan, 2020, pp. 1-2, doi: 10.1109/ICCE-Taiwan49838.2020.9258272. (Year: 2020).*
Nguyen, D.-A .; Tran, X.-T .; Iacopi, F. A Review of Algorithms and Hardware Implementations for Spiking Neural Networks. J. Low Power Electron. Appl. 2021, 11, 23. https://doi.org/10.3390/jlpea11020023 (Year: 2021).*

(Continued)

*Primary Examiner* — Haimei Jiang
*Assistant Examiner* — Alexandria Josephine Miller
(74) *Attorney, Agent, or Firm* — Maschoff Brennan

(57)            ABSTRACT
A method is provided and includes operations as below: training a spiking neural network (SNN) in a first device to generate multiple first weight values of M bits; calculating multiple second weight values of N bits corresponding to the first weight values according to a threshold value, the number M, and the first weight values, wherein the number N is smaller than the number M; retraining the spiking neural network with the second weight values to update the second weight values; and performing a write operation to save the updated plurality of second weight values in a memory in a second device for performing a spiking neural network operation in the second device.

20 Claims, 4 Drawing Sheets

100

(56) References Cited

OTHER PUBLICATIONS

Rathi, Nitin, Priyadarshini Panda, and Kaushik Roy. "STDP-based pruning of connections and weight quantization in spiking neural networks for energy-efficient recognition." IEEE Transactions on Computer-Aided Design of Integrated Circuits and Systems 38.4 ( 2018): 668-677. (Year: 2019).*

Chankyu Lee et al., "Enabling Spike-Based Backpropagation for Training Deep Neural Network Architectures", Front. Neurosci. 14:119. doi: 10.3389/fnins.2020.00119, Feb. 28, 2020.

Yujie Wu et al., "Direct Training for Spiking Neural Networks: Faster, Larger, Better", Proceedings of the AAAI Conference on Artificial Intelligence, 33(01), 1311-1318, Jan. 27, 2019.

* cited by examiner

200

400

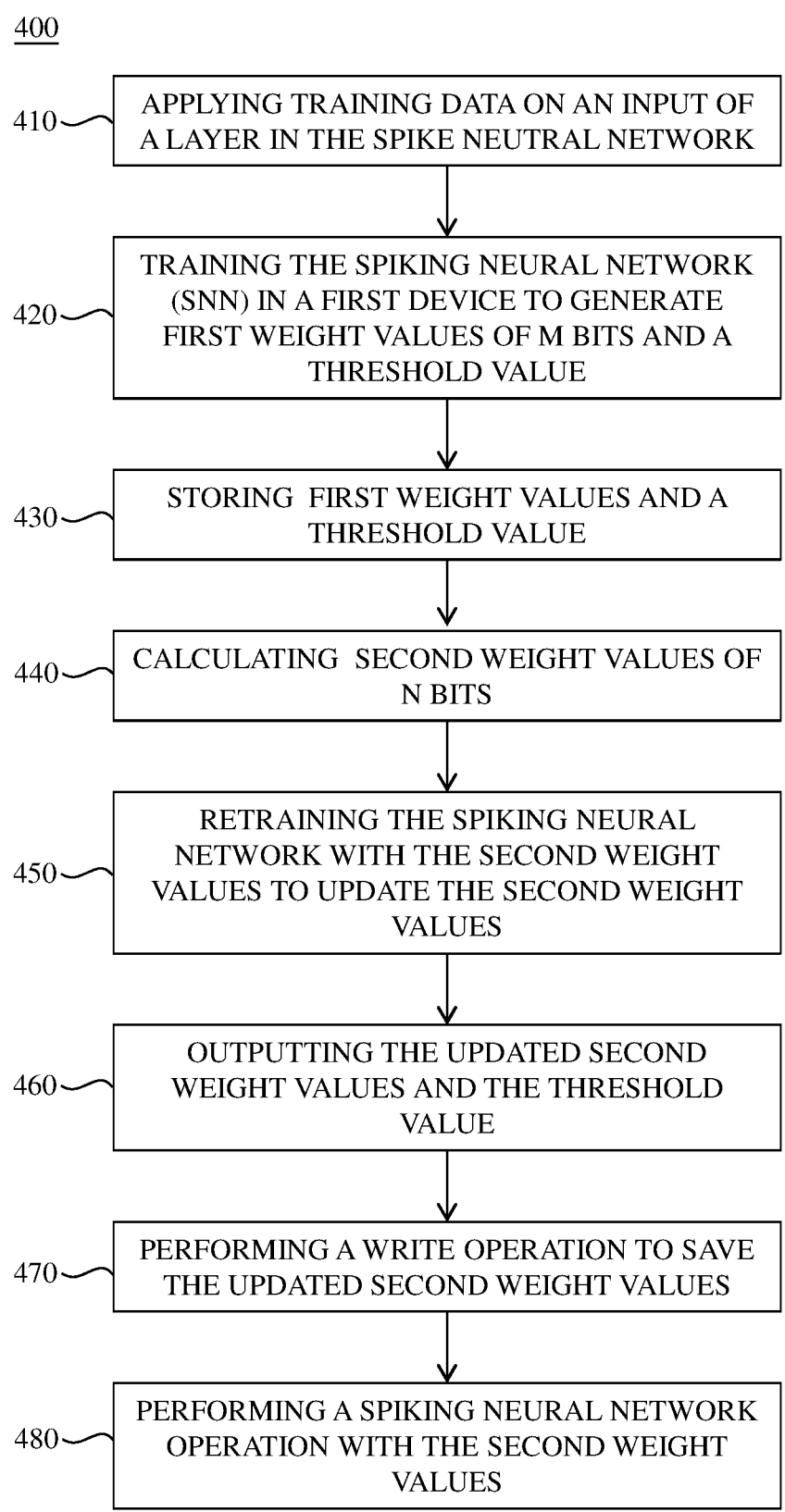

410 — APPLYING TRAINING DATA ON AN INPUT OF A LAYER IN THE SPIKE NEUTRAL NETWORK

420 — TRAINING THE SPIKING NEURAL NETWORK (SNN) IN A FIRST DEVICE TO GENERATE FIRST WEIGHT VALUES OF M BITS AND A THRESHOLD VALUE

430 — STORING FIRST WEIGHT VALUES AND A THRESHOLD VALUE

440 — CALCULATING SECOND WEIGHT VALUES OF N BITS

450 — RETRAINING THE SPIKING NEURAL NETWORK WITH THE SECOND WEIGHT VALUES TO UPDATE THE SECOND WEIGHT VALUES

460 — OUTPUTTING THE UPDATED SECOND WEIGHT VALUES AND THE THRESHOLD VALUE

470 — PERFORMING A WRITE OPERATION TO SAVE THE UPDATED SECOND WEIGHT VALUES

480 — PERFORMING A SPIKING NEURAL NETWORK OPERATION WITH THE SECOND WEIGHT VALUES

FIG. 4

METHOD FOR NEURAL NETWORK WITH WEIGHT QUANTIZATION

BACKGROUND

Neural networks may be used in a variety of different applications. For example, a neural network may be used to perform tasks including, but not limited to, speech recognition, visual objection recognition and/or localization, image reconstruction, anomaly detection, other applications where pattern recognition may be needed, and the like. Spiking neural networks are a particular class of neural networks suited for processing data with a time and/or sequential aspect.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a flow chart of an example of a method for quantizing weight values in a spiking neural network, in accordance with some embodiments.

DETAILED DESCRIPTION

Figure 1:
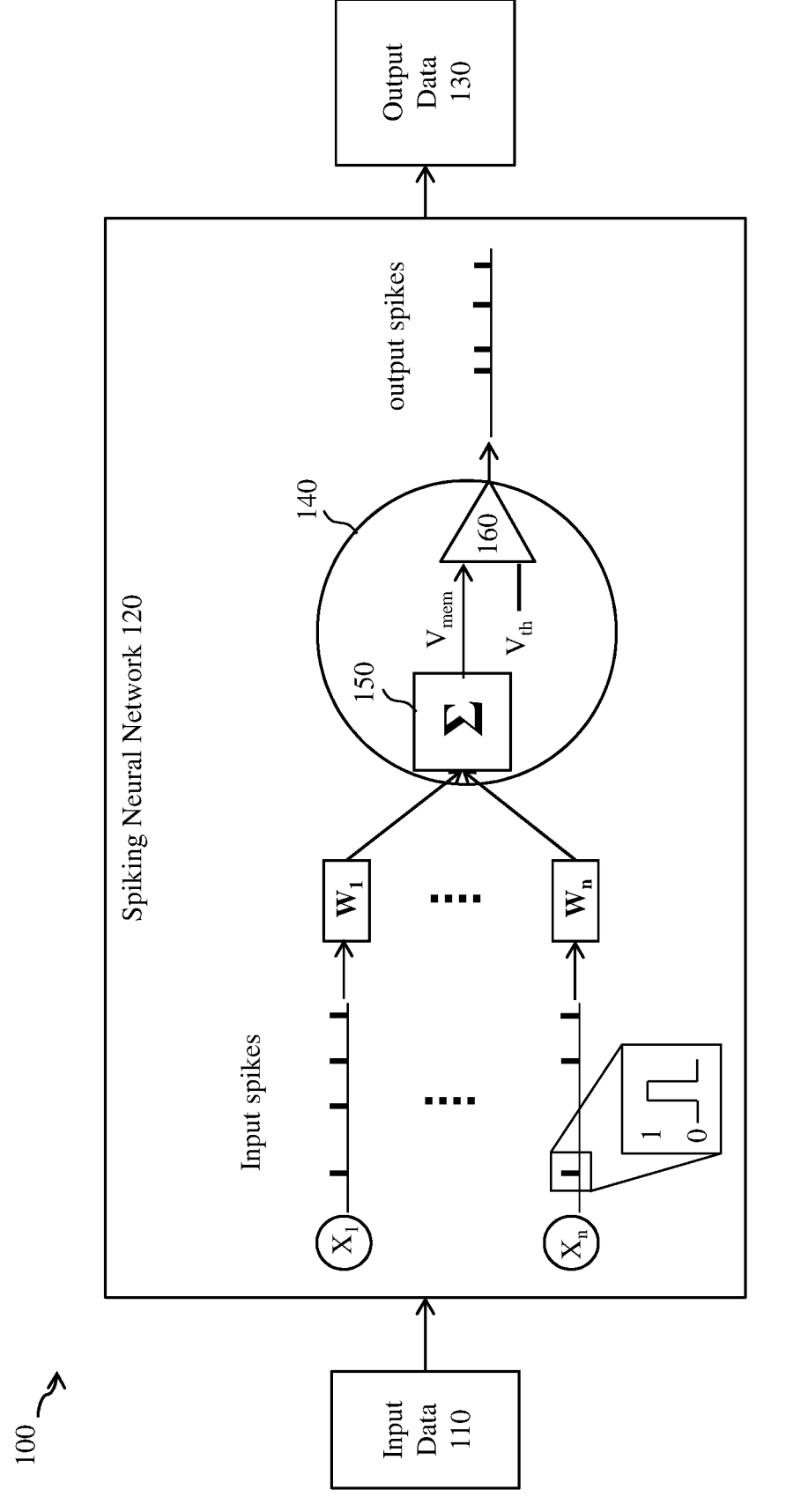
FIG. 1 is a schematic diagram illustrating a process of performing a neural network implementing one of a detection or classification application, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term.

Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Within a spiking neural network, "spikes" are transmitted between neurons. This characteristic of spiking neural networks may be leveraged to implement power-optimized neural networks. For example, the spiking neural network utilizes a particular neuron model that suppresses activity in portions of the spiking neural network, thereby allowing the spiking neural network to consume less power than other types of neural networks. Activity may be suppressed by using a thresholding model for neurons in the spiking neural network. Unless a feature is sufficiently strong in a given neuron, the response in the spiking neural network is zero (0) or no spikes being generated. These power optimized neural networks may be implemented in a variety of different types of devices and/or systems including, but not limited to, consumer devices, servers, cloud server applications, and the like.

This application relates to spiking neural networks. More particularly, the application relates to training the neural network in a computation-resource-rich device to obtain quantized weight values and deploying the neural network in a computation-resource-lacking device with improved accuracy.

Reference is now made to FIG. 1. FIG. 1 is a schematic diagram illustrating a system 100 using a spiking neural network, in accordance with some embodiments. In some embodiments, the system 100 is implemented in a (computing) device 310 of FIG. 3 and device 500 of FIG. 5 using the methods 200 and 400 of FIGS. 2 and 4 below.

For illustration, the system 100 includes a spiking neural network 120 that receives input data 110 and accordingly outputs output data 130. In some embodiments, the system 100 is configured to implement one of a detection or classification applications using the spiking neural network 120. For example, in some embodiments, the input data 110 is media information (e.g., images, audio, video data) for detection, classification, recognition, or any suitable applications. Accordingly, the system 100 receives the input data 110 and outputs spike(s) corresponding to detected/recognized feature(s) in the received input data 110, and further outputs value(s) corresponding to the output spikes as the output data 130.

In some embodiments, in a basic form of the spiking neural network 120 it includes nodes, called neurons, and edges, called synapses, between nodes. A neuron is adapted to perform two functions: accumulate "membrane potential," and "spike." The membrane potential resembles an accumulating counter, such that when the membrane potential becomes high enough, the neuron spikes. Unlike the conventional analog neuron models which compute and transmit the continuous-valued signals, the spiking neuron uses the discrete spike streams to process information, and is commonly referred to as a "presynaptic neuron." When the presynaptic neuron spikes, it sends out spike messages to all target neuron(s) of the presynaptic neuron, called "postsynaptic neuron(s)." Each of these messages has a "weight" associated with it, and these weights may be positive or negative, increasing or decreasing the postsynaptic neuron's potential. Additionally, time is a very important aspect of the spiking neural network 120, and some spike messages take longer to arrive at the postsynaptic neuron than others, even if they were sent from the presynaptic neuron at the same time.

Figure 2:
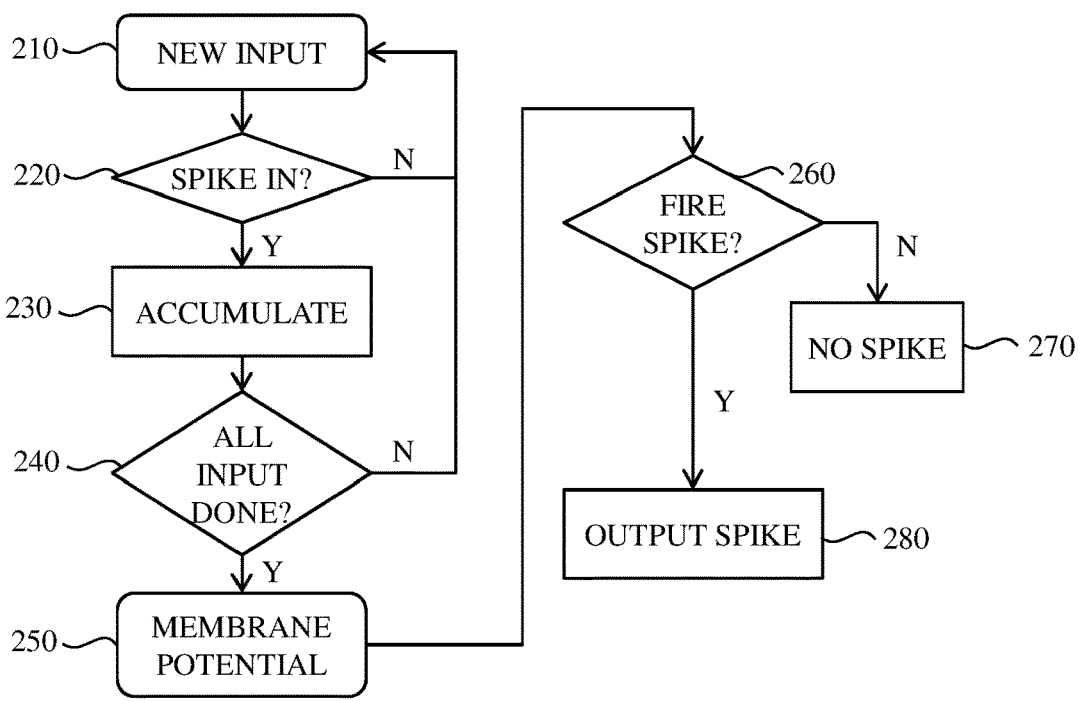
FIG. 2 is a flow chart of an example of a method for processing a spiking neural network operation, in accordance with some embodiments.

In the following paragraphs, the operations of the spiking neural network 120 are discussed with reference to FIGS. 1-3. FIG. 2 is a flow chart of an example of a method 200 for processing a spiking neural network operation, in accordance with some embodiments. It is understood that additional operations can be provided before, during, and after the processes shown by FIG. 2, and some of the operations described below can be replaced or eliminated, for additional embodiments of the method. The order of the operations/processes may be interchangeable. Throughout the various views and illustrative embodiments, like reference numbers are used to designate like elements. The method 200 includes operations 210, 220, 230, 240, 250, 260, 270, and 280 that are described below with reference to the system 100 of FIG. 1 and a neural network accelerator 320 of FIG. 3.

Figure 3:
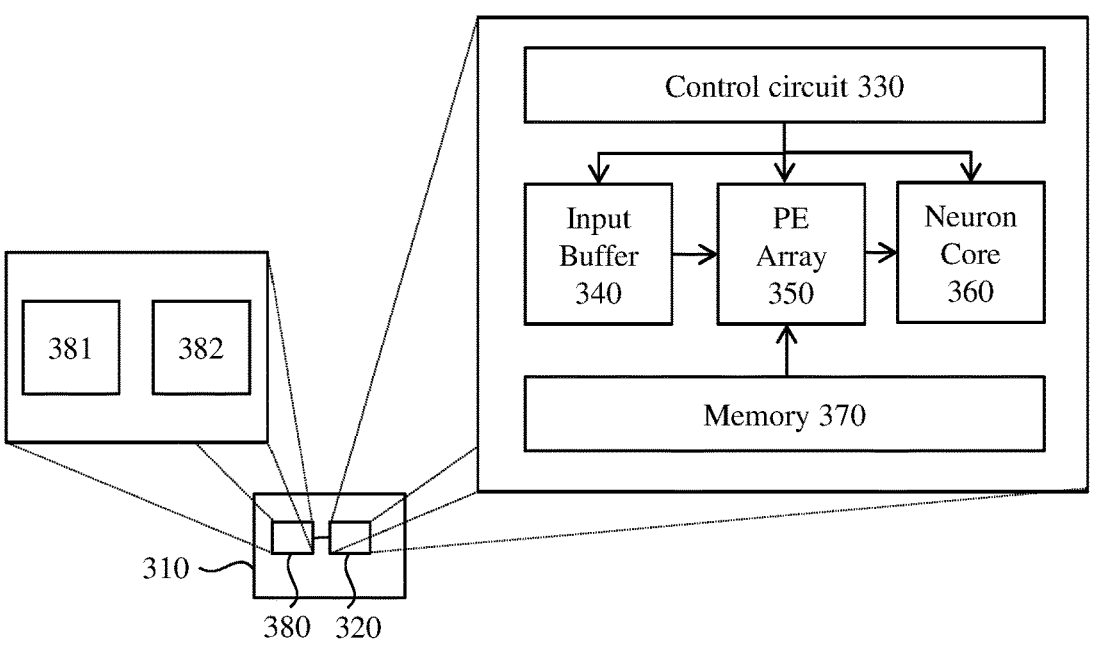
FIG. 3 is a schematic diagram illustrating an overview of a hardware accelerator for a spiking neural network, in accordance with some embodiments.

FIG. 3 is a schematic diagram illustrating an overview of the neural network accelerator 320 for the spiking neural network 120, in accordance with some embodiments. In some embodiments, the neural network accelerator 320 is on a die to form a neural chip (referred to as an accelerator chip). Several neural chips are packaged and networked together and included in any number of devices 310, such like servers, mobile devices, sensors, actuators, etc. For illustration, in the embodiments of FIG. 3, the neural network accelerator 320 includes a control circuit 330, an input buffer (circuit) 340, a processing element (PE) array 350 including multiple processing circuit, a neuron core (circuit) 360, and a memory 370. The input buffer 340 is configured to provide data, such like input spikes and weight values, to the processing elements array 350. The processing element array 350 is configured to take charge of the majority of computation tasks in the spiking neural network 120, for example, including accumulating and comparing, based on the input spikes and weight values accessed from the memory 370. The neural core 360 is configured to generate output spikes and store the corresponding output data. The control circuit 330 is configured to fetch instructions from an external memory (e.g., a memory 382) and decodes them to orchestrate all components in the neural network accelerator 320. In some embodiments, with the techniques discussed herein in FIG. 1, the weight values $W_1$-$W_n$, the membrane potential $V_{mem}$, and the threshold value $V_{th}$ may be stored in the memory 370.

In some embodiments, the neural network accelerator 320 is referred to as a programmable logic chip, implemented by System-On-a-Chip (SOC), coupled to a processing system 380 in the device 310, by a direct memory access (DMA) circuit. For example, the processing system 380 includes a processor 381 running programs to orchestrate the neural network operations in the neural network accelerator 320 via configuring a DMA circuit (not shown) to transfer data and instructions between a memory 382 on the processing system 380, the input buffer 340 and the neuron core 360. In some embodiments, the processor 381 in the processing system 380 is implemented by a general-purpose processor, and the memory 382 stores data, instructions (programming codes), parameters corresponding to the spiking neural network 120.

Reference now is made to the method 200 and FIGS. 1-3. In operation 210, the input data 110 is transmitted to the spiking neural network 120 by the control circuit 330.

In operation 220, the control circuit 330 determines whether presynaptic neuron $X_1$ to $X_n$ in an input layer of the spiking neural network 120 use binary input spikes to process information of the input data 110. When the input spikes are received, the operation 230 is performed; otherwise, the operation 210 is perform to obtain the input data 110.

In some embodiments, the charge carried by the input spikes forms a postsynaptic potential (PSP). In operation 230, a postsynaptic neuron 140 receives the weighted input spikes through synapses, in which each of weights $W_1$ to $W_n$, stored in the memory 370, correspond to one of the input spikes. The postsynaptic neuron 140 further accumulates and integrates weighted input spikes (weighted PSP).

In operation 240, the control circuit 330 determines whether all input spikes are received. Alternative stated, a preset period for accumulating input spike is terminated. When the determination result indicated that the accumulation is completed, the operation 250 is performed; otherwise, the operation 210 is performed.

In operation 250, the postsynaptic neuron 140 generates membrane potential $V_{mem}$ of the postsynaptic neuron 140 by an adder 150.

In operation 260, the postsynaptic neuron 140 further compares the membrane potential $V_{mem}$ with a threshold value $V_{th}$ to determine to fire the output spike. When the membrane potential $V_{mem}$ is less than threshold value $V_{th}$, the operation 270 is performed and no spike is fired. When the membrane potential $V_{mem}$ is greater than threshold value $V_{th}$, the operation 280 is performed and the postsynaptic neuron 140 fires the output spike.

The configurations of FIGS. 1-3 are given for illustrative purposes. Various implements are within the complemented scope of the present application. For example, in some embodiments, the neural network accelerator 320 includes another memory, rather than the memory 370, that is adapted to store the membrane potentials $V_{mem}$, integration results corresponding to the weighted input spikes, and the threshold value $V_{th}$.

In some approaches, as the number of input data increases, storing and computing these data in the spiking neural network requires significant memory and computing resources. Furthermore, when the spiking neural network is operating on devices, such like edge or mobile devices, with limited hardware resources, it suffers accuracy degradation as processed data are quantized to have smaller bit depth (number of bits available), compared with the processed data in resource-rich devices. For example, when a spiking neural network, trained with data of 32-bit floating points in a first device (e.g., desktop for scientific study in laboratory), is deployed to a second device (e.g., a commercial mobile phone) capable to compute with lower data bit resolution, the performance (e.g., accuracy) of the deployed spiking neural network is usually downgraded.

The present application provides a method for quantizing weight values in a training stage of the neural network in a computation-resource-rich first device and further operating the neural network in a computation-resource-lacking second device with updated quantized weight values.

Reference is now made to FIG. 4. FIG. 4 is a flow chart of an example of a method 400 for quantizing weight values in a spiking neural network, in accordance with some embodiments. It is understood that additional operations can be provided before, during, and after the processes shown by FIG. 4, and some of the operations described below can be replaced or eliminated, for additional embodiments of the method. The order of the operations/processes may be interchangeable. Throughout the various views and illustrative embodiments, like reference numbers are used to designate like elements. The method 400 includes operations 410, 420, 430, 440, 450, 460, 470, and 480 that are described below with reference to FIGS. 1-3.

In operation 410, training data, configured with respect to the input data 110 of FIG. 1, is applied on the input layer in the spiking neural network 120 in a first deice (e.g., configured with respect to a resource-rich device 310 of FIG. 3).

In operation 420, the spiking neural network is trained with the training data to generate weight values $W_{r1}$ to $W_{rn}$, configured with respect to the weight values $W_1$ to $W_n$, and a threshold value, configured with respect to the threshold value $V_{th}$ in FIG. 1. The number n refers to a number of input neurons in the input layers of the spiking neural network 120. In some embodiments, the weight values $W_{r1}$ to $W_{rn}$ are of M bits, M being a positive integer, for example, 32, 64. Alternatively stated, the weight values in the spiking neural network 120 firstly are encoded with M bits. In some embodiments, specifically, training the spiking neural network 120 includes outputting an output value corresponding to the training data, calculating a loss by a difference between the output value and the desired value corresponding to the training data, propagating the loss back to the spiking neural network 120, and determining parameters, such as the weight values $W_{r1}$ to $W_{rn}$ and the threshold value, of neurons included in the spiking neural network 120.

In operation 430, the weight values $W_{r1}$ to $W_{rn}$ and the threshold value are stored in the memory 370. In various embodiments, the threshold value is stored in a threshold buffer in the neural network accelerator 320.

In operation 440, one of weight values $W_{q1}$ to $W_{qn}$ of N bits are calculated based on a corresponding one of the weight values $W_{r1}$ to $W_{rn}$ and the threshold value, N being a positive integer smaller than the M, for example, 4, 8. Alternatively stated, the weight values $W_{q1}$ to $W_{qn}$ are encoded with N bits. Specifically, one of the weight values $W_{q1}$ to $W_{qn}$ and the corresponding one of the weight values $W_{r1}$ to $W_{rn}$ are associated with one of the presynaptic neurons. For example, the weight value $W_{q1}$ and $W_{r1}$ are associated with the presynaptic neurons $X_1$. In some embodiments, the processor 381 in the processing system 380 computes and generates the calculated weight values $W_{q1}$ to $W_{qn}$, and further saves the calculated weight values $W_{q1}$ to $W_{qn}$ in the memory 370.

In some embodiments, each one of the weight values $W_{q1}$ to $W_{qn}$ is calculated according to the number N and a ratio between the threshold value and the corresponding one of the weight values $W_{r1}$ to $W_{rn}$, and is expressed as the equation (1) below:

$$W_{qi} = \text{clip}\left(\left\lceil \frac{W_{ri}}{V_{th}} \times 2^{N-1} \right\rceil, -2^{N-1}, 2^{N-1}\right) \tag{1}$$

in which $W_{qi}$ is the i-th one of the weight values $W_{q1}$ to $W_{qn}$, $W_{ri}$ is one, of the weight values $W_{r1}$ to $W_m$, corresponding to the $W_{qi}$, and $V_{th}$ is the threshold value. The weight value $W_{qi}$ is obtained by round $$\left(\frac{W_{ri}}{V_{th}} \times 2^{N-1}\right)$$

to the nearest integer and limited (e.g., the clip function shown in the equation (1)) to have a maximum value of $2^{N-1}$ and a minimum value of $-2^{N-1}$. In some embodiments, the threshold value $V_{th}$ is of N bits. Alternatively stated, the weight values $W_{q1}$ to $W_{qn}$ and the threshold value $V_{th}$ have the same bit depth.

In various embodiments, each one of the weight values $W_{q1}$ to $W_{qn}$ is calculated according to the number N, a ratio between the threshold value and a maximum value of the weight values $W_{r1}$ to $W_{rn}$, and is expressed as the equation (2) below:

$$W_{qi} = V_{th} \times \left(\left\lceil \frac{W_{ri}}{\gamma} \times 2^{N-1} \right\rceil, -2^{N-1}, 2^{N-1}\right) \tag{2}$$

$$\gamma = V_{th} \times 2^{\left\lceil \log_2\left(\frac{\max(W_r)}{V_{th}}\right)\right\rceil} \tag{3}$$

in which $W_{qi}$ is the i-th one of the weight values $W_{q1}$ to $W_{qn}$, $W_{ri}$ is one, of the weight values $W_{r1}$ to $W_m$, corresponding to the $W_{qi}$, $\max(W_r)$ is the maximum value of the weight values $W_{r1}$ to $W_m$, and $V_{th}$ is the threshold value. The weight value $W_{qi}$ is obtained by round $$\left(\frac{W_{ri}}{\gamma} \times 2^{N-1}\right)$$

to the nearest integer and limited (e.g., the clip function shown in the equation (2)) to have a maximum value of $2^{N-1}$ and a minimum value of $-2^{N-1}$. Alternatively stated, based on the equations (2)-(3), in some embodiments, the weight values $W_{q1}$ to $W_{qn}$ are also calculated based on a product of the threshold value $V_{th}$ and a ratio between the threshold value $V_{th}$ and a corresponding one of the weight values $W_{r1}$ to $W_m$.

In operation 450, the spiking neural network 120 is retrained with the weight values $W_{q1}$ to $W_{qn}$ and threshold value to update the weight values $W_{q1}$ to $W_{qn}$. For example, the training data is applied again on the input layer in the spiking neural network 120. The membrane potential (e.g., $V_{mem}$) is generating according to the training data and the weight values $W_{q1}$ to $W_{qn}$, and further is compared with the threshold value $V_{th}$ to generate the output data. In response to the comparison between the output data and the desire data corresponding to the training data, the weight values $W_{q1}$ to $W_{qn}$ are further updated based on the loss between the output data and the desire data. Alternatively stated, the updated weight values $W_{q1}$ to $W_{qn}$ are referred to as optimized weight values.

In some embodiments, when the weight values $W_{q1}$ to $W_{qn}$ are calculated based on the equation (2), retraining the spiking neural network 120 further includes operations of generating a training factor K in the spiking neural network 120 based on a comparison between output data and desire data corresponding to the training data. Based on the training factor K, the threshold value $V_{th}$ is encoded with (N+K) bits, K being a positive integer. For example, the weight values $W_{q1}$ to $W_{qn}$ are of 4 bits (e.g., N equals 4), and the threshold value $V_{th}$ is of 8 bits (e.g., K equals 4). In some embodiments, when the spiking neural network 120 is referred to a relatively larger neural network, including a number, more than a certain number (e.g., 256), of input neurons in an input layer, the threshold value $V_{th}$, having a bit depth greater than that of the weight values $W_{q1}$ to $W_{qn}$, contributes high accuracy due to fine value resolution of the threshold value $V_{th}$. In some embodiments, the threshold value $V_{th}$ is set to a number of power of 2.

Continued with the embodiments above, retraining the spiking neural network 120 further includes operations of comparing the (N+K+1)-th bit of the membrane potential $V_{mem}$ with 0 and generating an output spike (having value 1) in response to the comparison. For example, when the (N+K+1)-th bit of the membrane potential $V_{mem}$ equals "1," greater than 0, it implies that the membrane potential $V_{mem}$ is greater than the threshold value Vth. Accordingly, the postsynaptic neuron 140 generates the output spike. In contrast, when the (N+K+1)-th bit of the membrane potential $V_{mem}$ equals "0," it implies that the membrane potential $V_{mem}$ is not greater than the threshold value Vth. Accordingly, the postsynaptic neuron 140 does not generate the output spike.

Furthermore, in some embodiments of the training stage of the spiking neural network 120, after the postsynaptic neuron 140 generates the output spike, the spiking neural network 120 sets the membrane potential $V_{mem}$ to have the threshold value $V_{th}$. Alternatively stated, the postsynaptic neuron 140 continuously generates the output spike during training, and accordingly reduces training resources by stopping updating the membrane potential $V_{mem}$.

In operation 460, the updated weight values $W_{q1}$ to $W_{qn}$ and the threshold value are output for a second spiking neural network deployed in the computation-resource-lacking second device, in which the second spiking neural network is configured with respect to the spiking neural network 120 in the computation-resource-rich first device.

For example, with reference to FIG. 3, the spiking neural network 120 is trained and the updated weight values $W_{q1}$ to $W_{qn}$ and the threshold value are obtained in the neural network accelerator 320 of a first device 310 which is a computation-resource-rich device. The first device 310 further outputs the updated weight values $W_{q1}$ to $W_{qn}$ and the threshold value for the neural network accelerator 320 in a second device 310' that is a computation-resource-lacking device.

Sequentially, in operation 470, the processing system 380, coupled to the neural network accelerator 320 in the second device 310', receives and performs a write operation to save the updated weight values $W_{q1}$ to $W_{qn}$ and the threshold value in the memory 370 of the neural network accelerator 320 in the second device 310'.

In operation 480, the neural network accelerator 320 in the second device 310' performs the spiking neural network operation with the updated weight values $W_{q1}$ to $W_{qn}$ and the threshold value.

In some embodiments, the method 400 further includes operations of selecting one of the equations (1) and (2) to calculate the weight values $W_{q1}$ to $W_{qn}$. Specifically, in some embodiments, in the training stage of the spiking neural network 120 in the first device 310, the processor 381 executes the codes to select the equation for calculating the weight values $W_{q1}$ to $W_{qn}$ based on the comparison between a preset number and the number n of the presynaptic neuron $X_1$ to $X_n$. For example, when the number n in the embodiments is less than the preset number that equals to 256, the weight values $W_{q1}$ to $W_{qn}$ are calculated according to the equation (1). In various embodiments, the processor 381 executes the codes to select the equation (2) for calculating the weight values $W_{q1}$ to $W_{qn}$ as the number n is greater than 256.

The configurations of FIG. 4 are given for illustrative purposes. Various implements are within the contemplated scope of the present disclosure. For example, in some embodiments, in the operation of calculating the weight values $W_{q1}$ to $W_{qn}$ based on the equation (1), the weight values $W_{q1}$ to $W_{qn}$ and the threshold value $V_{th}$ have different bit depth. For example, the threshold value $V_{th}$ is encoded with (N+K) bits. In various embodiments, the preset number mentioned above for the comparison is not equal 256.

Compared with some approaches in the deploying neural network in the computation-resource-lacking devices with quantized weight values, the accuracy of the spiking neural network increases by at least around 4% and reduced power consumption with the configurations of the present application. In addition, because the threshold value $V_{th}$ has the value of power of 2, it is more economical for hardware implementation to perform the operations of comparing the membrane potential with the threshold value in the spiking neural network operation.

Figure 5:
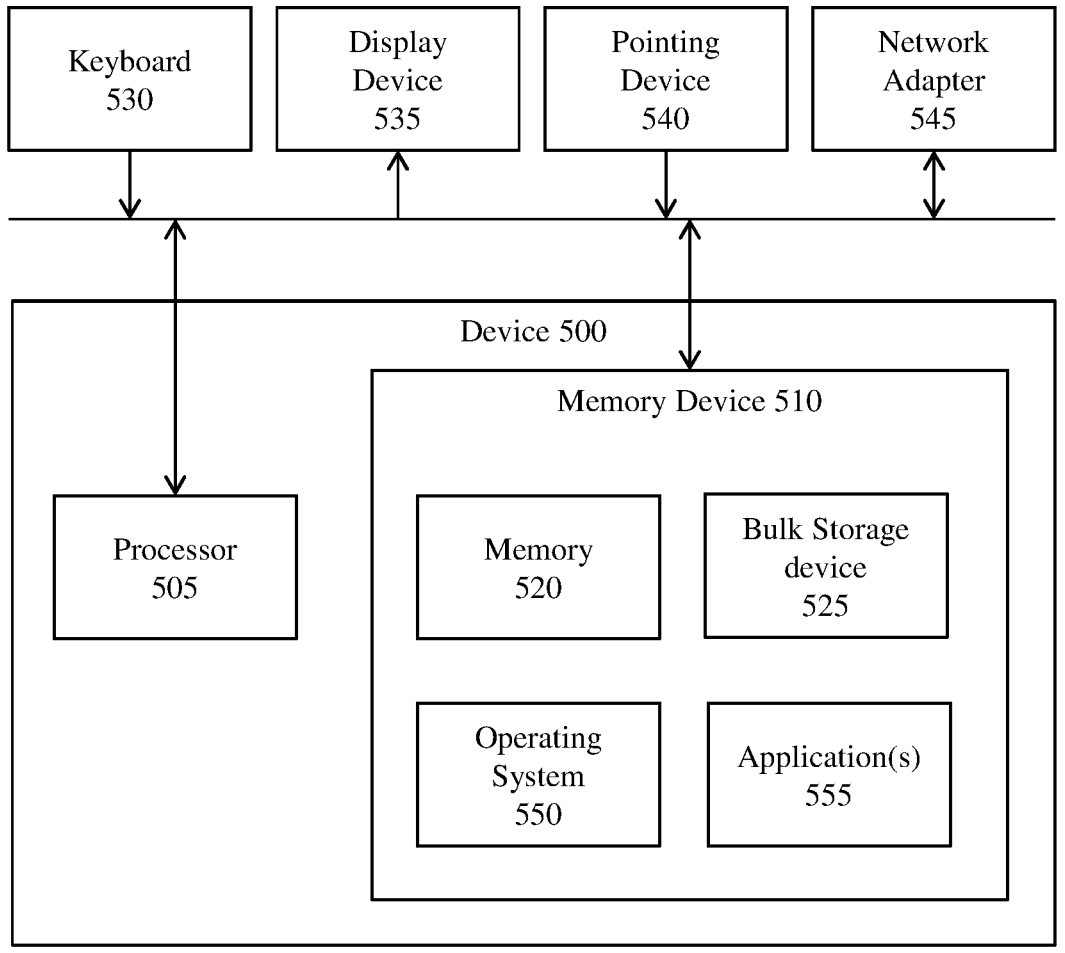
FIG. 5 is a block diagram illustrating an example of a data processing system used to implement a spiking neural network.

Reference is now made to FIG. 5. FIG. 5 is a block diagram illustrating an example of a device 500, for data processing, used to implement embodiments as described herein with reference to FIGS. 1-4. In some embodiments, the device 500 is configured with respect to the device 310 of FIG. 3. As pictured, device 500 includes at least one processor, e.g., a central processing unit (CPU), 505 coupled to memory device 510 through a system bus 515 or other suitable circuitry. Device 500 stores computer readable instructions (also referred to as "program code") within memory device 510. Memory device 510 may be considered an example of computer readable storage media. Processor 505 executes the program code accessed from memory device 510 via system bus 515. In some embodiments, the processor 505 is configured with respect to, for example, the processor 381 of FIG. 3, and the memory device 510 is configured with respect to, for example, the memory 382 of FIG. 3.

Memory device 510 may include one or more physical memory devices such as, for example, a memory 520 and one or more bulk storage devices 525. Memory 520 refers to random access memory (RAM) or other non-persistent memory device(s) generally used during actual execution of the program code. Bulk storage device 525 may be implemented as a hard disk drive (HDD), solid state drive (SSD), or other persistent data storage device. Device 500 may also include one or more cache memories (not shown) that provide temporary storage of at least some program code in order to reduce the number of times program code must be retrieved from bulk storage device 525 during execution.

Input/output (I/O) devices such as a keyboard 530, a display device 535, a pointing device 540, and one or more network adapters 545 may be coupled to device 500. The I/O devices may be coupled to device 500 either directly or through intervening I/O controllers. In some cases, one or more of the I/O devices may be combined as in the case where a touchscreen is used as display device 535. In that case, display device 535 may also implement keyboard 530 and pointing device 540. Network adapter 545 may be used to couple device 500 to other systems, computer systems, remote printers, and/or remote storage devices through intervening private or public networks. Modems, cable modems, Ethernet cards, and wireless transceivers and/or radios are examples of different types of network adapter 545 that may be used with device 500. Depending upon the particular implementation of device 500, the specific type of network adapter, or network adapters as the case may be, will vary.

As pictured in FIG. 5, memory device 510 may store an operating system 550 and one or more applications 555. Application 555, for example, may be a neural network utility that, when executed, partitions a neural network. In one aspect, operating system 550 and application 555, being implemented in the form of executable program code, are executed by device 500 and, in particular, by processor 505. As such, operating system 550 and application 555 may be considered an integrated part of device 500. Operating system 550, application 555, and any data items used, generated, and/or operated upon by device 500 are functional data structures that impart functionality when utilized by device 500.

In one aspect, device 500 may be a computer or other device that is suitable for storing and/or executing program code. Device 500 may represent any of a variety of computer systems and/or devices that include a processor and memory and that are capable of performing the operations described within this disclosure. In some cases, the particular computer system and/or device may include fewer components or more components than described. Device 500 may be implemented as a single system as shown or as a plurality of networked or interconnected systems each having an architecture the same as, or similar to, that of device 500.

In one example, device 500 may receive a neural network as an input. Device 500, in executing operating system 550 and application 555, may partition the neural network and store the partitioned neural network within a memory or other computer-readable storage medium for later execution.

As described above, the present application provides a method for weight quantization in the neural network in order to improve accuracy of the neural network deployed in a device different from one in which the neural network is trained. With the configurations of the present application, the improvements in performance, whether for power consumption or execution time, allow devices that have constrained power, computing resource and/or thermal budgets to implement spiking neural network.

In some embodiments, a method is provided and includes operations as below: training a spiking neural network (SNN) in a first device to generate multiple first weight values of M bits; calculating multiple second weight values of N bits corresponding to the first weight values according to a threshold value, the number M, and the first weight values, wherein the number N is smaller than the number M; retraining the spiking neural network with the second weight values to update the second weight values; and performing a write operation to save the updated plurality of second weight values in a memory in a second device for performing a spiking neural network operation in the second device.

In some embodiments, the calculating the second weight values includes calculating each of the second weight values based on an equation below:

$$W_q = \left\lceil \frac{W_r}{V_{th}} \times 2^{N-1} \right\rceil$$

in which $W_q$ is a corresponding one of the second weight values, $W_r$ is a corresponding one of the first weight values, and $V_{th}$ is the threshold value.

In some embodiments, the threshold value $V_{th}$ of the N bits.

In some embodiments, a maximum value of the second weight values equals to $(2^{N-1})$, and a minimum value of the second weight values equals to $-(2^{N-1})$.

In some embodiments, calculating the second weight values includes calculating each of the second weight values based on equation below, $$W_q = V_{th} \left\lceil \frac{W_r}{\gamma} \times 2^{N-1} \right\rceil$$

$$\gamma = V_{th} \times 2^{\left\lceil log_2\left(\frac{max(W_r)}{V_{th}}\right)\right\rceil}$$

in which $W_q$ is a corresponding one of the second weight values, $W_r$ is a corresponding one of the first weight values, and $V_{th}$ is the threshold value.

In some embodiments, retraining the spiking neural network with the second weight values includes generating a training factor K in the spiking neural network based on a comparison between output data and desire data corresponding to training data for retraining the spiking neural network. The threshold value is of (N+K) bits.

In some embodiments, retraining the spiking neural network with the second weight values further includes operations of generating membrane potential according to training data and the second weight values; comparing a (N+K+1)-th bit of the membrane potential with 0; and in response to the comparison, generating an output spike.

In some embodiments, calculating the second weight values includes calculating the second weight values according to to a ratio between the threshold value and a maximum value of the first weight values. Retraining the spiking neural network with the second weight values includes generating a training factor K in the spiking neural network based on a comparison between output data and desire data corresponding to training data for retraining the spiking neural network; generating membrane potential according to the training data and the second weight values; and when a (N+K+1)-th bit of the membrane potential is 1, generating an output spike. The threshold value is of (N+K) bits.

In some embodiments, retraining the spiking neural network with the second weight values includes operations of applying training data on an input of a layer in the spiking neutral network; generating membrane potential according to the training data and the second weight values; comparing the membrane potential with the threshold value to generate output data; and in response to the comparison between the output data and desire data corresponding to the training data, updating the second weight values as the optimized plurality of second weight values.

In some embodiments, a computer program product is provided and includes a computer readable memory having program codes stored thereon to implement a first spiking neural network. The program codes are executable by a processor to perform operations including calculating, according to multiple first weight values and a threshold value, multiple second weight values and storing the second weight values in the computer readable memory; retraining the first spiking neural network with the second weight values and the threshold value to update the second weight values and the threshold value; and outputting the updated plurality of second weight values for a second spiking neural network corresponding to the first spike neural network.

In some embodiments, the program codes are executable by the processor to perform operations further including training the first spiking neural network to obtain the first weight values and the threshold value. The first weight values are of M bits and the threshold value, and the second weight values are of N bits, M being greater than N.

In some embodiments, calculating the second weight values includes calculating each of the second weight values according to a ratio between the threshold value and a corresponding one of the first weight values.

In some embodiments, calculating the second weight values includes calculating each of the second weight values according to a product of the threshold value and a ratio between the threshold value and a corresponding one of the first weight values.

In some embodiments, the retraining the first spiking neural network with the second weight values and the threshold value includes operations of applying training data on the first spiking neural network; generating membrane potential according to the training data and the second weight values; generating an output spike by comparing the membrane potential with the threshold value; and after generating the output spike, setting the membrane potential to have the threshold value.

In some embodiments, the program codes are executable by the processor to perform operations further including output the updated threshold value for the second spiking neural network.

In some embodiments, a method is provided and includes operations as below: generating multiple first weight values of M bits by training a spiking neural network (SNN); generating, based on ratio between the first weight values and a threshold value, multiple second weight values of N bits that range from a first value to a second value, wherein the first and second values are associated with the number N, wherein the number N is different from the number M; and performing a spiking neural network operation with the second weight values.

In some embodiments, the number M is greater than the number N.

In some embodiments, the method further includes retraining the spiking neural network with the second weight values to generate the updated threshold value. The updated threshold value is of (N+K) bits, K being a positive integer.

In some embodiments, retraining the spiking neural network includes generating membrane potential according to training data and the second weight values; generating an output spike when a (N+K+1)-th bit of the membrane potential is 1; and setting the membrane potential to have the threshold value.

In some embodiments, generating the second weight values includes rounding the second weight values to nearest integers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

training a spiking neural network (SNN) in a first device to generate a plurality of first weight values of M bits;

calculating a plurality of second weight values of N bits corresponding to the plurality of first weight values according to a threshold value of the SNN, the number M, and the plurality of first weight values, wherein the number N is smaller than the number M, wherein the threshold value of the SNN is compared with a membrane potential of a neuron of the SNN to determine whether the neuron fires an output spike;

retraining the spiking neural network with the plurality of second weight values to update the plurality of second weight values; and performing a write operation to save the updated plurality of second weight values in a memory in a second device for performing a spiking neural network operation in the second device, wherein the calculating the plurality of second weight values comprises:

calculating each of the plurality of second weight values based on an equation below, $$W_q = \left\lceil \frac{W_r}{V_{th}} \times 2^{N-1} \right\rceil$$

wherein Wq is a corresponding one of the plurality of second weight values, Wr is a corresponding one of the plurality of first weight values, and Vth is the threshold value.

2. The method of claim 1, wherein the threshold value is of the N bits.

3. The method of claim 1, wherein a maximum value of the plurality of second weight values equals to $(2^{N-1})$, and a minimum value of the plurality of second weight values equals to $-(2^{N-1})$.

4. The method of claim 1, wherein the calculating the plurality of second weight values comprises:

calculating the plurality of second weight values according to a ratio between the threshold value and a maximum value of the plurality of first weight values;

wherein the retraining the spiking neural network with the plurality of second weight values comprises:

generating a training factor K in the spiking neural network based on a comparison between output data and desire data corresponding to training data for retraining the spiking neural network, wherein the threshold value is of (N+K) bits;

generating the membrane potential according to the training data and the plurality of second weight values; and when a (N+K+1)-th bit of the membrane potential is 1, generating the output spike.

5. The method of claim 1, wherein the retraining the spiking neural network with the plurality of second weight values comprises:

applying training data on an input of a layer in the spiking neural network;

generating the membrane potential according to the training data and the plurality of second weight values;

comparing the membrane potential with the threshold value to generate output data; and in response to the comparison between the output data and desire data corresponding to the training data, updating the plurality of second weight values as the optimized plurality of second weight values.

6. A computer program product comprising a computer readable memory having program codes stored thereon to implement a first spiking neural network, wherein the program codes are executable by a processor to perform operations comprising:

calculating, according to a plurality of first weight values and a threshold value of the first spiking neural network, a plurality of second weight values of N bits and storing the plurality of second weight values in the computer readable memory, wherein the threshold value of the first spiking neural network is compared with a membrane potential of a neuron of the first spiking neural network to determine whether the neuron fires an output spike;

retraining the first spiking neural network with the plurality of second weight values and the threshold value of the first spiking neural network to update the plurality of second weight values and the threshold value of the first spiking neural network; and outputting the updated plurality of second weight values for a second spiking neural network corresponding to the first spike neural network, wherein the calculating the plurality of second weight values comprises:

calculating each of the plurality of second weight values based on equation below, $$W_q = V_{th} \left\lceil \frac{W_r}{\gamma} \times 2^{N-1} \right\rceil$$

$$\gamma = V_{th} \times 2^{\left\lceil log2 \left( \frac{max(W_r)}{V_{th}} \right) \right\rceil}$$

wherein Wq is a corresponding one of the plurality of second weight values, Wr is a corresponding one of the plurality of first weight values, and Vth is the threshold value.

7. The computer program product of claim 6, wherein the program codes are executable by the processor to perform operations further comprising:

training the first spiking neural network to obtain the plurality of first weight values and the threshold value, wherein the plurality of first weight values are of M bits and the threshold value, and the plurality of second weight values are of N bits, M being greater than N.

8. The computer program product of claim 6, wherein the calculating the plurality of second weight values comprises:

calculating each of the plurality of second weight values according to a ratio between the threshold value and a corresponding one of the plurality of first weight values.

9. The computer program product of claim 6, wherein the calculating the plurality of second weight values comprises:

calculating each of the plurality of second weight values according to a product of the threshold value and a ratio between the threshold value and a corresponding one of the plurality of first weight values.

10. The computer program product of claim 6, wherein the retraining the first spiking neural network with the plurality of second weight values and the threshold value comprises:

applying training data on the first spiking neural network;

generating the membrane potential according to the training data and the plurality of second weight values;

generating the output spike by comparing the membrane potential with the threshold value; and after generating the output spike, setting the membrane potential to have the threshold value.

11. The computer program product of claim 6, wherein the retraining the spiking neural network with the plurality of second weight values comprises:

generating a training factor K in the spiking neural network based on a comparison between output data and desire data corresponding to training data for retraining the spiking neural network, wherein the threshold value is of (N+K) bits.

12. The computer program product of claim 11, wherein the retraining the spiking neural network with the plurality of second weight values further comprises:

generating the membrane potential according to training data and the plurality of second weight values;

comparing a (N+K+1)-th bit of the membrane potential with 0; and in response to the comparison, generating the output spike.

13. The computer program product of claim 6, wherein the program codes are executable by the processor to perform operations further comprising:

output the updated threshold value for the second spiking neural network.

14. A method, comprising:

generating a plurality of first weight values of M bits by training a spiking neural network (SNN) in a first device;

generating, based on a ratio between the plurality of first weight values and a threshold value of the SNN, a plurality of second weight values of N bits that range from a first value to a second value, wherein the first and second values are associated with the number N, wherein the number N is different from the number M, wherein the threshold value of the SNN is compared with a membrane potential of a neuron of the SNN to determine whether the neuron fires an output spike; and saving the plurality of second weight values in a memory of a second device and performing a spiking neural network operation with the plurality of second weight values in the second device, wherein the calculating the plurality of second weight values comprises:

calculating each of the plurality of second weight values based on an equation below, $$W_q = \left\lceil \frac{W_r}{V_{th}} \times 2^{N-1} \right\rfloor$$

wherein Wq is a corresponding one of the plurality of second weight values, Wr is a corresponding one of the plurality of first weight values, and Vth is the threshold value.

15. The method of claim 14, wherein the number M is greater than the number N.

16. The method of claim 14, further comprising:

retraining the spiking neural network with the plurality of second weight values to generate the updated threshold value, wherein the updated threshold value is of (N+K) bits, K being a positive integer.

17. The method of claim 16, wherein the retraining the spiking neural network comprises:

generating the membrane potential according to training data and the plurality of second weight values;

when a (N+K+1)-th bit of the membrane potential is 1, generating the output spike; and setting the membrane potential to have the threshold value.

18. The method of claim 14, wherein the generating the plurality of second weight values comprises:

rounding the plurality of second weight values to nearest integers.

19. The method of claim 14, wherein the threshold value is of the N bits.

20. The method of claim 14, wherein a maximum value of the plurality of second weight values equals to $(2^{N-1})$, and a minimum value of the plurality of second weight values equals to $-(2^{N-1})$.

\* \* \* \* \*